United States Patent [19]

Yoshioka et al.

[11] 4,455,734
[45] Jun. 26, 1984

[54] METHOD OF ASSEMBLING UNIFORM-SPEED JOINT

[75] Inventors: Teruo Yoshioka, Kawagoe; Shiro Naito; Yuzo Abe, both of Hidaka; Kuninobu Uchida, Tokyo, all of Japan

[73] Assignee: Honda Giken Kogyo Kabushiki Kaisha, Tokyo, Japan

[21] Appl. No.: 443,111

[22] Filed: Nov. 19, 1982

[30] Foreign Application Priority Data

Nov. 19, 1981 [JP] Japan ................... 56-185666

[51] Int. Cl.³ ........................................... B23P 11/00
[52] U.S. Cl. ...................................... 29/434; 29/437; 29/439; 464/139; 464/906
[58] Field of Search ................... 29/434, 437, 439; 403/57, 58, 359; 464/139, 152, 906

[56] References Cited

U.S. PATENT DOCUMENTS

| | | | |
|---|---|---|---|
| 2,325,460 | 7/1943 | Amberg | 464/906 X |
| 3,162,024 | 12/1964 | Breuer | 464/906 X |
| 3,646,778 | 3/1972 | Fisher | 29/434 X |
| 3,982,840 | 9/1976 | Grosseau | 29/434 X |

Primary Examiner—Carl E. Hall
Assistant Examiner—Ronald S. Wallace
Attorney, Agent, or Firm—Armstrong, Nikaido, Marmelstein & Kubovcik

[57] ABSTRACT

Therein is disclosed a method for assembling a uniform-speed joint having an inner rotary body and an outer rotary body which transmits a rotational force from one to the other through a plurality of small spheres in receiving holes on the disposed outer peripheral surface of said inner rotary body and including a pair of small spheres diametrically facing each other where the intersecting angle between the rotation axes of said inner rotary body and said outer rotary body is variable and the rotational speed is not changed. The method comprising the steps of:

(a) fitting said small spheres into a diametrically opposed pair of said small-sphere receiving holes in said inner rotary body;

(b) fitting said inner rotary body into said outer rotary body while maintaining the rotation axis of said inner rotary body perpendicular to the rotational axis of said outer rotary body with no interference between said pair of small spheres and the edge of said outer rotary body;

(c) bring the rotation axes of said inner rotary body and said outer rotary body into coincidence with each other; and (d) swinging said inner rotary body relative to said outer rotary body about the diametrical swing axis passing through said pair of small spheres and then fitting small spheres into the corresponding small-sphere receiving holes of said inner rotary body in the portion of said inner rotary body which is out of said outer rotary body.

1 Claim, 13 Drawing Figures

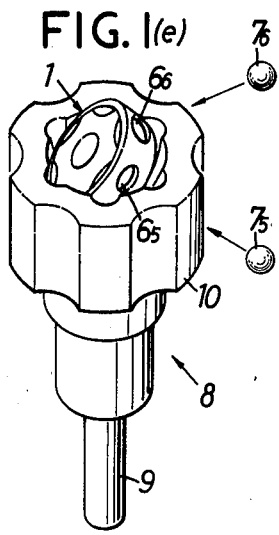
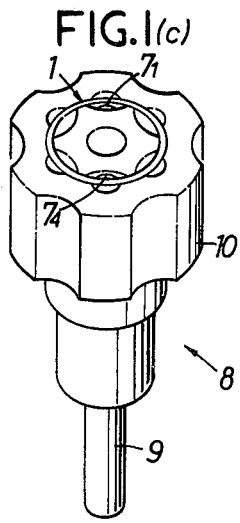
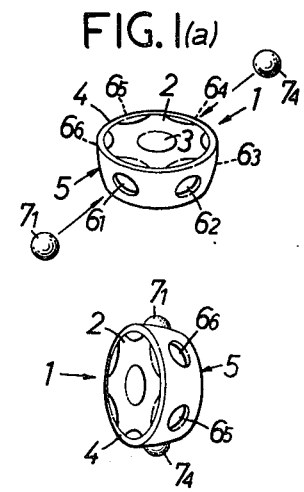
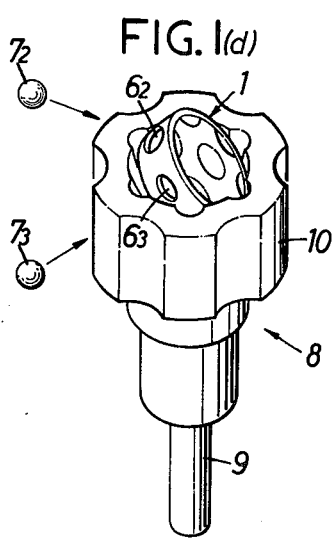
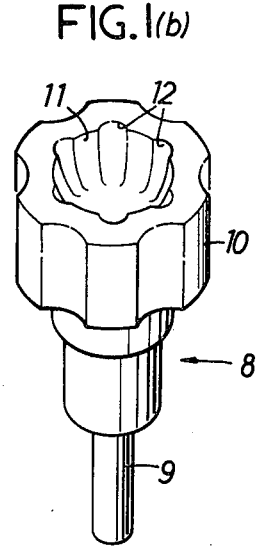

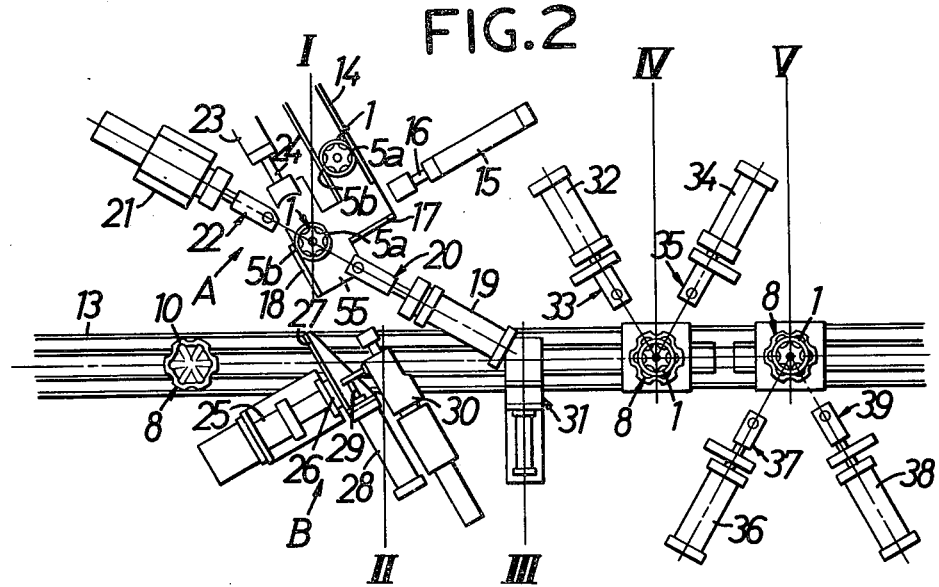

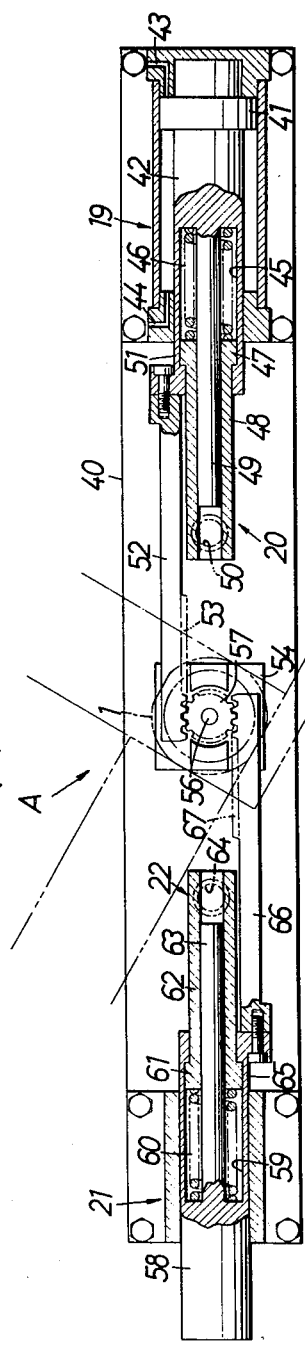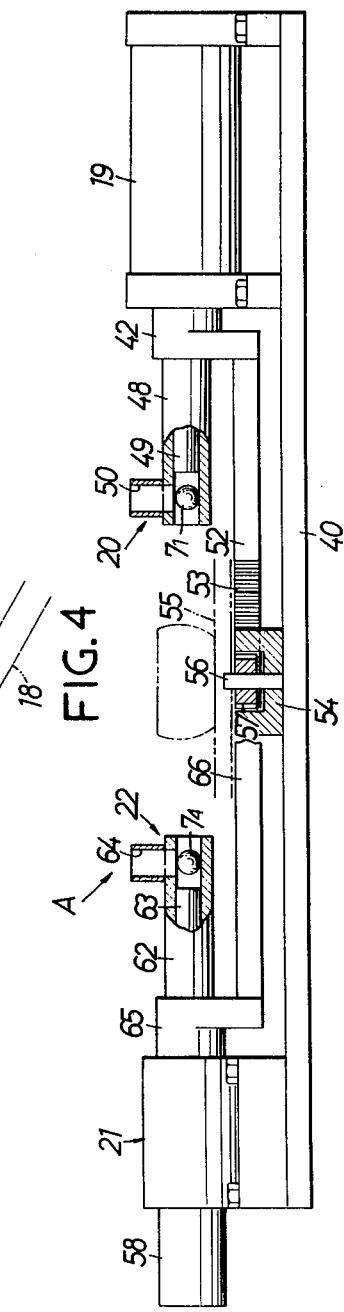

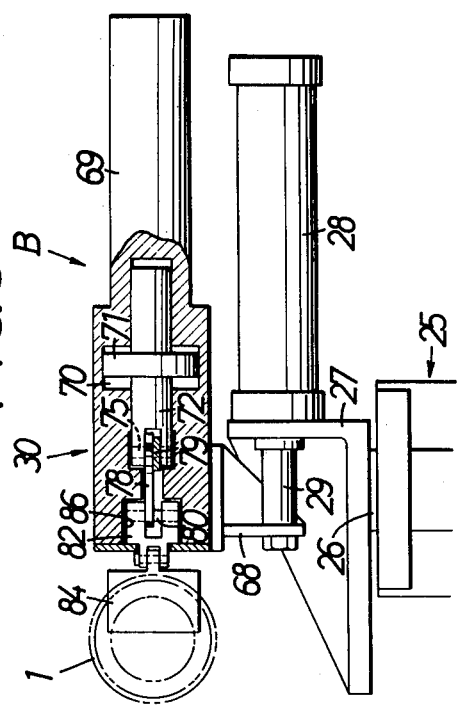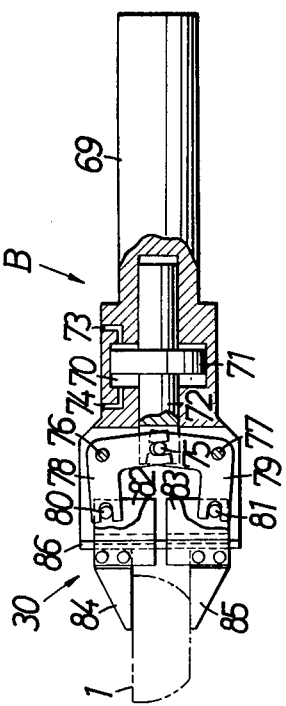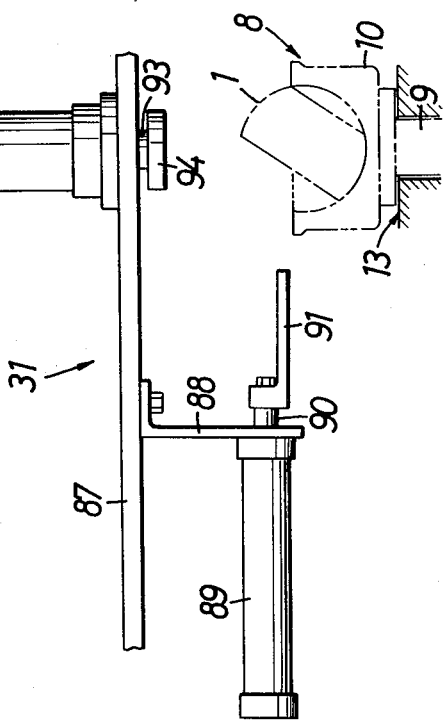

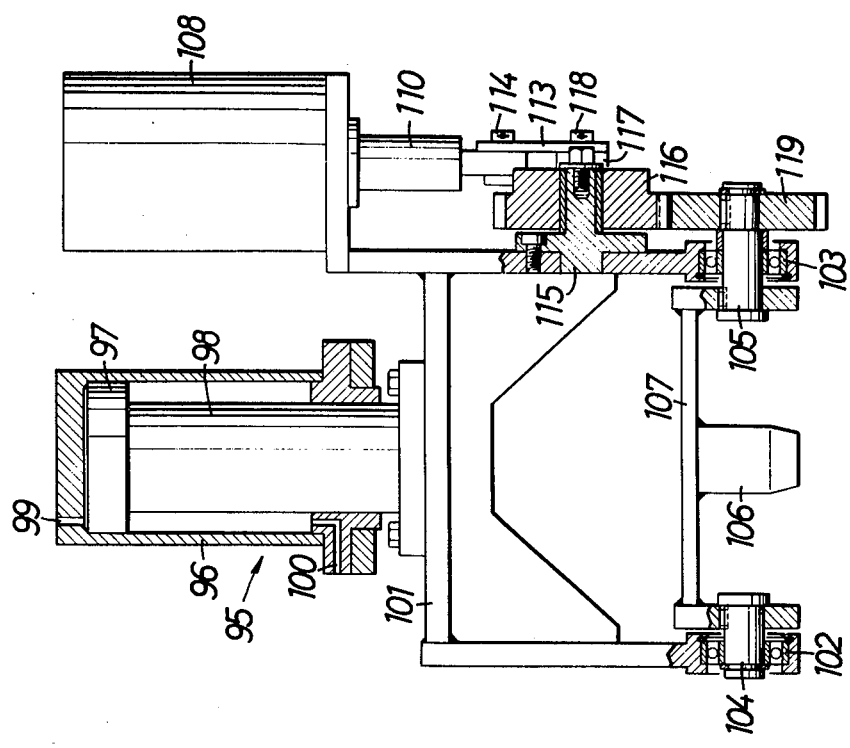
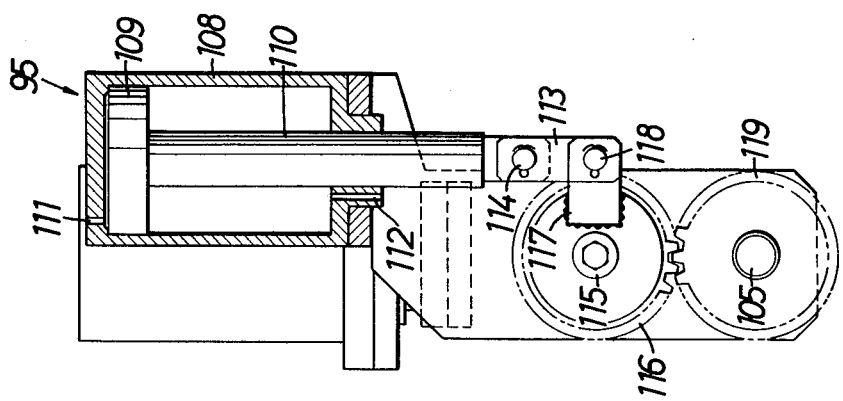

METHOD OF ASSEMBLING UNIFORM-SPEED JOINT

BACKGROUND OF THE INVENTION

1. Field of the Invention

The present invention relates to a uniform-speed joint assembling method capable of automatically assembling a uniform-speed joint of a type that an inner rotary body and an outer rotary body transmit a rotational force from one to the other through small spheres disposed along the outer peripheral part of the inner rotary body.

2. Description of the Prior Art

Since it is extremely complicated to assemble a uniform-speed joint arranged such that an inner rotary body and an outer rotary body transmit a rotational force from one to the other through small spheres disposed along the outer peripheral part of the inner rotary body under conditions where the intersecting angle between the rotation axes of the rotary bodies is variable and moreover, rotation speed is not changed, there has hitherto been no means for assembling the uniform-speed joint other than manual assembly by skilled workers. Consequently, much labor and time are needed, and there is a limit in improving the production efficiency.

SUMMARY OF THE INVENTION

It is, therefore, a primary object of the present invention to provide a uniform-speed joint assembling method capable of automatically, without need for any manual operations, assembling a uniform-speed joint with an inner rotary body and an outer rotary body that transmits a rotational force from one to the other through small spheres disposed along the outer peripheral surface of the inner rotary body under conditions where the intersecting angle between the rotation axes of the rotary bodies is variable and moreover rotational speed is not changed.

To this end, the present invention provides a method for assembling a uniform-speed joint having an inner rotary body and an outer rotary body which transmits a rotational force from one to the other through a plurality of small spheres in receiving holes on the disposed outer peripheral surface of said inner rotary body and including a pair of small spheres diametrically facing each other where the intersecting angle between the rotation axes of said inner rotary body and said outer rotary body is variable and the rotational speed is not changed, said method comprising the steps of:

(a) fitting said small spheres into a diametrically opposed pair of said small-sphere receiving holes in said inner rotary body;

(b) fitting said inner rotary body into said outer rotary body while maintaining the rotation axis of said inner rotary body perpendicular to the rotational axis of said outer rotary body with no interference between said pair of small spheres and the edge of said outer rotary body;

(c) bring the rotation axes of said inner rotary body and said outer rotary body into coincidence with each other; and (c) swinging said inner rotary body relative to said outer rotary body about the diametrical swing axis passing through said pair of small spheres and then fitting small spheres into the corresponding small-sphere receiving holes of said inner rotary body in the portion of said inner rotary body which is out of said outer rotary body.

BRIEF DESCRIPTION OF THE DRAWINGS

FIG. 1(a) through FIG. 1(e) show an example of operation steps in assembling an example of a uniform-speed joint;

FIG. 2 shows an arrangement of the system for carrying out the assembling steps shown in FIG. 1 by a uniform-speed joint assembling method according to the invention;

FIG. 3 is a partial section plan view of an essential part of a small-sphere press fitting device used in the invention;

FIG. 4 is a partial section side elevational view of an essential part of the small-sphere press fitting device shown in FIG. 3;

FIG. 5 is a partial section plan view of an essential part of an inner rotary body fitting device used in the present invention;

FIG. 6 is a partial section side elevational view of an essential part of the inner rotary body fitting device shown in FIG. 5;

FIG. 7 is a side elevational view of an essential part of a correcting device used in the present invention;

FIG. 8 is a partial section front elevational view of an essential part of a swing device; and FIG. 9 is a partial section side elevational view of an essential part of the swing device shown in FIG. 8.

DESCRIPTION OF THE PREFERRED EMBODIMENT

A preferred embodiment of a uniform-speed joint assembling apparatus according to the present invention will be described hereinunder with reference to the accompanying drawings.

First, in FIG. 1(a), an inner rotary body 1 of a uniform-speed joint has an inner ring member 2 and an annular cage 4 secured to the outer peripheral surface of the inner ring member 2. The annular cage 4 has a convex outer surface. The inner ring member 2 has at its central portion a connecting hole 3 with female splines formed on its inner peripheral surface for receiving either of an input-side rotating shaft or an output-side rotating shaft. In addition, six small-sphere receiving holes $6_1, 6_2, \ldots, 6_6$ are formed in an outer peripheral part 5 of the inner ring member 2 along the outer peripheral surface thereof and the cage 4, so as to be spaced equally in the circumferential direction.

Moreover, as shown in FIG. 1(b), an outer rotary body 8 of the uniform-speed joint has an outer ring part 10 having an inner surface 11 formed as a concave surface which corresponds to the convex surface forming the outer surface of the outer peripheral part 5 of the inner rotary body 1. Small-sphere receiving grooves 12 are formed on the inner surface 11 to engage the small spheres fitted in the small-sphere receiving holes $6_1, 6_2, \ldots, 6_6$ of the inner rotary body 1 for transmitting a rotational force through these small spheres. A connecting part 9 is adapted to be connected with the other one of the input-side rotating shaft or the output-side rotating shaft.

Because the center of the concave surface forming the inner surface 11 of the outer ring part 10 of the outer rotary body 8 is generally inside the outer ring part 10 on the rotational axis of the outer rotary body 8, the diameter of the edge part of the inner surface 11 in the direction perpendicular to the rotation axis is smaller than the diameter of an assembled inner rotary body in the direction perpendicular to the rotation axis, and it is, therefore, impossible to insert the inner rotary body 1 into the outer ring part 10 of the outer rotary body 8 after the small spheres are fitted into the respective small-sphere receiving holes $6_1, 6_2, \ldots, 6_6$ of the inner rotary body 1.

As a first step, therefore, a pair of small-sphere receiving holes $6_1, 6_4$ located at positions diametrically facing each other are selected from the small-sphere receiving holes $6_1, 6_2, \ldots, 6_6$ of the inner rotary body 1, and small spheres $7_1, 7_4$ are forced into the pair of small-sphere receiving holes $6_1, 6_4$ in the radial direction respectively, as shown in FIG. 1(a). Then, as a second step, the inner rotary body 1 is inserted into the outer rotary body 8 while maintaining a relative positioning of the inner rotary body 1 to the outer rotary body 8 wherein the rotation axis of the inner rotary body 1 is perpendicular to that of the outer rotary body 8 and moreover there is no interference between the pair of small spheres $7_1$ and $7_4$ and the edge part of the outer rotary body 8, as shown in FIG. 1(b).

As a third step, the rotation axis of the inner rotary body 1 is made to coincide with that of the outer rotary body 8, as shown in FIG. 1(c). Then, as a fourth step, while the inner rotary body 1 is swung relatively to the outer rotary body 8 about the diametrical swing axis passing through the pair of small spheres $7_1$ and $7_4$, small spheres $7_2$ and $7_3$ are forced into the small-sphere receiving holes $6_2$ and $6_3$ on the one side of the inner rotary body 1 having come out of the outer rotary body 8 in the radial direction of the inner rotary body 1 respectively, and then, small spheres $7_5$ and $7_6$ are forced into the small-sphere receiving holes $6_5$ and $6_6$ on the other side in the radial direction of the inner rotary body 1 respectively to complete assembly, as shown in FIG. 1(d) and FIG. 1(e).

FIG. 2 shows an arrangement of a system for assembling uniform-speed joints through the above-described steps. A carrying device 13, e.g., a conveyor, for successively carrying the outer rotary bodies 8 with constant intervals therebetween and positioned such that the inner surface 11 of the outer ring part 10 of each outer rotary body 8 is directed upward, is disposed so as to pass in order an automatic operation position I for carrying out the first step shown in FIG. 1(a), an automatic operation position II for carrying out the second step shown in FIG. 1(b), an automatic operation position III for carrying out the third step shown in FIG. 1(c), and automatic operation positions IV and V for carrying out the fourth step shown in FIG. 1(d) and FIG. 1(e).

At the automatic operation position I, the inner rotary bodies 1 are successively fed through a chute 14. When each of the inner rotary bodies 1 fed through the chute 14 contacts with a guide wall 17 perpendicular to the chute 14, a rod 16 of an actuating cylinder 15 immediately extends so as to push the inner rotary body 1 and move it along the guide wall 17. Upon contacting a guide wall 18 perpendicular to the guide wall 17, the inner rotary body 1 is held at that position. Under this condition, the small spheres $7_1, 7_4$ are forced into the corresponding small-sphere receiving holes $6_1$ and $6_4$ by means of small-sphere press fitting members 20 and 22 formed at the ends of the rods of a pair of actuating cylinders 19 and 21, respectively, placed on the straight line passing through a diametrically opposed pair of small-sphere receiving holes, e.g., $6_1$ and $6_4$ of the inner rotary body 1 as well as disposed facing to each other with the inner rotary body 1 therebetween.

In this case, it is necessary to set the direction of the inner rotary body 1 so that a pair of diametrically opposed small-sphere receiving holes, e.g., $6_1$ and $6_4$ are on the axes of the small-sphere press fitting members 20 and 22 respectively, as accurately as possible. In order to automatically properly orient the inner rotary body 1, the inner rotary body 1 can be moved while constantly maintaining a proper direction and held by utilizing chamfered parts 5a and 5b previously formed on the outer surface of the inner rotary body 1 so that it can be smoothly inserted into the outer rotary body 8. The chamfered parts 5a and 5b successively contact with the right and left side wall surfaces of the chute 14 and the end surface of the rod 16 and the wall surface of the guide wall 18. It is also possible to automatically correct the direction of the inner rotary body 1 in such a way that when the inner rotary body 1 contacts the guide wall 18, the direction of each of the selected small-sphere receiving holes of the inner rotary body 1 is detected by a detecting means, and then, the inner rotary body 1 is rotated about the rotation axis so that the inner rotary body 1 is properly oriented.

FIG. 3 and FIG. 4 show an embodiment of a small-sphere press fitting device A for carrying out the first step at the automatic operation position I shown in FIG. 2. A piston 41 is received in the actuating cylinder 19 secured to a base 40. A rod 42, formed integrally with the piston 41 is adapted to extend from the cylinder when working fluid, e.g., a hydraulic oil, is introduced into the actuating cylinder 19 through a fluid inlet/outlet port 43 and to withdraw into the cylinder when working fluid is introduced into the actuating cylinder 19 through a fluid inlet/outlet port 44.

The rod 42 has an annular cylinder chamber 45 having an air vent formed therein. An annular piston 47 is received in the annular cylinder chamber 45 so as to be constantly pressed toward the end of the rod 42 by means of a spring 46. The end of an annular rod 48 formed integrally with the annular piston 47 projects farther than the end of a smaller-diameter projecting part 49 projecting along the axis of the rod 42 by the resilient operation of the spring 46. Formed at the end of the annular rod 48 is a tubular small-sphere feed part 50 for successively feeding, one by one, the small spheres $7_1$ from a magazine, (now shown), into the end part of the annular rod 48.

The proximal end of an interlocking arm 52 is secured to the end of an annular outer wall part 51 of the rod 42. A rack 53 formed on the side surface of the distal end of the interlocking arm 52 engages a pinion 57 on a pinion shaft 56 rotatably supported between a holding plate 54 secured to the base 40 and a holding plate 55 for holding the inner rotary body 1. The pinion shaft 56 is positioned so that the rotation axis of the inner rotary body 1 coincides with that of the pinion 57, in FIG. 3 and FIG. 4, when the inner rotary body 1 is moved along the guide wall 17 and contacts the guide wall 18 in FIG. 2.

A rod 58 is slidably received by the actuating cylinder 21 secured to the base 40 at a position where the actuating cylinder 21 faces the actuating cylinder 19 with the pinion shaft 56 therebetween. An annular piston 61 is received in an annular cylinder chamber 59 with an air vent formed in the rod 58. The piston 61 is constantly pressed towards the end of the rod 58 by a spring 60. The end of an annular rod 62 formed integrally with the annular piston 61 projects farther than a smaller-diameter projecting part 63 projecting along the axis of the rod 58. Formed at the end part of the annular rod 62 is a tubular small-sphere feed part 64 for successively feeding, one by one, the small spheres 7₄ from a magazine, (now shown), into the end part of the annular rod 62.

The proximal end of an interlocking arm 66 is secured to to the end of an annular outer wall 65 of the rod 58. A rack 67 formed on the side surface of the distal end of the interlocking arm 66 engages the pinion 57 on the side opposite to the rack 53. Both the axes of the rod 42 and the rod 58 are on the same straight line perpendicular to the axis of the pinion shaft 56 and moreover, the distance between the end surface of the smaller-diameter projecting part 49 of the rod 42 and the axis of the pinion shaft 56 is maintained equal to the distance between the end surface of the smaller-diameter projecting part 63 of the rod 58 and the axis of the pinion shaft 56.

Since the small-sphere press fitting device A shown in FIG. 3 and FIG. 4 is arranged as described above, when the rod 42 is in a withdrawn position because of working fluid introduced into the actuating cylinder 19 from the fluid inlet/outlet port 44, the rod 58 interlocked with the rod 42 through the interlocking arms 52, 66 is at a rearward position. In this condition, the small spheres 7₁ and 7₄ are fed into the end parts of the corresponding annular rods 48 and 62 from magazines through the small-sphere feed parts 50 and 64 respectively. When the inner rotary body 1 moves along the guide wall 17 shown in FIG. 1 and contacts the guide wall 18 in a proper direction posture, the fluid inlet/outlet port 44 is coupled to a fluid tank and working fluid is introduced into the actuating cylinder 19 from the fluid inlet/outlet port 43, so that the rod 42 is extended. Following this, the rod 58 interlocked with the rod 42 advances. As a result, first, the end surfaces of the annular rods 48 and 62 contact the inner rotary body 1 from the sides diametrically facing to each other. As the rod 42 further advances, the rod 58 also further advances, so that the smaller-diameter projecting parts 49 and 63 move relative to the annular rods 48 and 62 against the resilient forces of the springs 46 and 60 respectively and force the small spheres 7₁ and 7₄ into the corresponding small-sphere receiving holes 6₁ and 6₄. In this case, the ends of the annular rods 48 and 62 function to reliably guide the corresponding small spheres 7₁ and 7₄ into the small-sphere receiving holes 6₁ and 6₄ respectively. On completion of the press fitting of the small spheres 7₁ and 7₄ into the small-sphere receiving holes 6₁ and 6₄, the fluid inlet/outlet port 43 is coupled to the fluid tank and working fluid is introduced into the actuating cylinder 19 from the fluid inlet/outlet port 44, causing the rod 42 to be moved rearward, followed by withdrawal of the rod 58.

In FIG. 2, when the rods of the actuating cylinders 19 and 21 withdraw on completion of the press fitting of the pair of small spheres 7₁ and 7₄ into the corresponding small-sphere receiving holes 6₁ and 6₄, the rod 24 of the actuating cylinder 23 immediately extends, pushing the inner rotary body 1 along the guide wall 18 so that the inner rotary body 1 is moved to a clamping device 30 of an inner rotary body fitting device B located at the automatic operation position II.

The inner rotary body fitting device B has a rotational drive device 25 for reciprocatingly rotating a rotating shaft 26 about the rotation axis within a given angle range, a supporting frame 27 secured to the end part of the rotating shaft 26, an actuating cylinder 28 secured to the supporting frame 27, and the clamping device 30 for clamping the inner rotary body 1 fitted to the end of a rod 29 of the actuating cylinder 28.

While standing by for receiving an inner rotary body 1, the actuating cylinder 28 is held horizontally for example. When the inner rotary body 1 starts moving along the guide wall 18, being pushed by the rod 24 of the actuating cylinder 23, the rod 29 of the actuating cylinder 28 is immediately extended. When the inner rotary body 1 reaches the edge of a holding plate 55, clamping pawls supported at the end of the clamping device 30 clamp the inner rotary body 1 from both the upper and lower sides. After the clamping device 30 clamps the inner rotary body 1, the rod 29 of the actuating cylinder 28 withdraws and the rotating shaft 26 of the rotational drive device 25 rotates, causing the clamping device 30 to swing from a clamping posture wherein the rotation axis of the inner rotary body 1 is directed in the vertical direction to a clamping posture wherein the inner rotary body 1 is placed at a lower position and the rotation axis thereof is directed in the horizontal direction. In synchronism with this action, the outer rotary body 8 is positioned below the inner rotary body 1 by means of the carrying device 13 and the rod 29 of the actuating cylinder 28 extends again, thereby allowing the inner rotary body 1 to be fitted into the outer rotary body 8 while maintaining the orientation of the outer rotary body 8 such that the rotation axis of the inner rotary body 1 is perpendicular to that of the outer rotary body 8 and moreover, there is no interference between the pair of small spheres 7₁ and 7₄ and the edge of the outer rotary body 8.

FIG. 5 and FIG. 6 show an embodiment of the inner rotary body fitting device B for carrying out the second step as shown in FIG. 1(b) at the automatic operation position II shown in FIG. 2. A main body 69 of the clamping device 30 is secured to the end of the rod 29 of the actuating cylinder 28 through a mounting member 68. A rod 72 formed integrally with a piston 71 slidably received by a cylinder chamber 70, formed in the main body 69 is adapted to extend when working fluid is introduced into the cylinder chamber 70 from a fluid inlet/outlet port 73 and withdrawn when working fluid is introduced into the cylinder chamber 70 from a fluid inlet/outlet port 74.

An engaging pin 75 is held at the end part of the rod 72. The engaging pin 75 is connected to one end of each of a pair of bell cranks 78 and 79 with their central portions pivotably supported by means of pivots 76 and 77 respectively. The other ends of the bell cranks 78 and 79 are coupled to engaging pins 80 and 81 secured to a pair of slidably contacting bodies 82 and 83 adapted to slidably contact along a guide groove 86 formed at the end part of the main body 69. The contacting bodies have corresponding clamping pawls 84 and 85 on their respective ends.

Accordingly, when the rod 72 is extended, the bell cranks 78 and 79 swing about the pivots 76 and 77 in directions such that their ends move outward, causing the clamping pawls 84 and 85 to separate from each other. When the rod 72 is withdrawn, the bell cranks 78 and 79 swing about the pivots 76 and 77 in a direction such that their ends come together, causing the clamping pawls 84 and 85 to approach each other.

Since the inner rotary body fitting device B shown in FIG. 5 and FIG. 6 is arranged as described above, while the inner rotary body 1 is standing by, the rotating shaft 26 of the rotational drive device 25 rotates so that the actuating cylinder 28 is made horizontal and the clamping pawls 84 and 85 face the inner rotary body 1 on the holding plate 55 shown in FIG. 12. In addition, the rod 29 of the actuating cylinder 28 contracts. Moreover, the fluid inlet/outlet port 74 is coupled to the fluid tank and working fluid is introduced into the cylinder chamber 70 from the fluid inlet/outlet port 73 to thereby extend the rod 72. Consequently, the bell cranks 78 and 79 are swung such that their ends separate from each other, so that the clamping pawls 84 and 85 separate from each other.

When the inner rotary body 1 is moved along the guide wall 18, being pushed by the rod 24 of the actuating cylinder 23 shown in FIG. 2, the rod 29 of the actuating cylinder 28 immediately extends. When the inner rotary body 1 reaches the edge part of the holding plate 55, the fluid inlet/outlet port 73 is coupled to the fluid tank and working fluid is introduced into the cylinder chamber 70 from the fluid inlet/outlet port 74, causing the rod 72 to withdraw. Consequently, the bell cranks 78 and 79 are swung such that their ends approach each other and the clamping pawls 84 and 85, thus, reliably clamp the inner rotary body 1 from both the upper and lower sides.

After the pair of clamping pawls 84 and 85 clamp the inner rotary body 1, the rod 29 of the actuating cylinder 28 withdraws and the rotating shaft 26 of the rotational drive device 25 rotates, causing the clamping device 30 to be swung from a clamping orientation where the rotation axis of the inner rotary body 1 is directed in the vertical direction to a clamping orientation where the inner rotary body 1 is placed at a lower position with the rotation axis directed in the horizontal direction. Then, when the rod 29 of the actuating cylinder 82 is extended again, the inner rotary body 1 is fitted into the outer rotary body 8 positioned thereunder while maintaining an orientation relative to the outer rotary body 8 such that the rotation axis of the inner rotary body 1 is perpendicular to that of the outer rotary body 8 and moreover, where there is no interference between the pair of small spheres $7_1$ and $7_4$ and the edge of the outer rotary body 8, as shown in FIG. 1(b).

After the inner rotary body 1 is fitted into the outer rotary body 8, the fluid inlet/outlet port 74 is coupled to the fluid tank and working fluid is introduced into the cylinder chamber 70 from the fluid inlet/outlet port 73, causing the rod 72 to extend. Consequently, the bell cranks 78 and 79 are swung so that their ends separate from each other, causing the clamping pawls 84 and 85 to move so as to separate from each other thereby releasing the clamped inner rotary body 1. Then, together with the withdrawal of the rod 29 of the actuating cylinder 28, the rotating shaft 26 of the rotational drive device 25 rotates in order to make the actuating cylinder 28 horizontal, so that the inner rotary body fitting device B maintains a standing-by state for the subsequent inner rotary body 1.

In FIG. 2, the outer rotary body 8 after being fitted with the inner rotary body 1 by means of the inner rotary body fitting device B is carried by means of the carrying device 13 until reaching the automatic operation position III for carrying out the third step, where the orientation of the inner rotary body 1 with respect to the outer rotary body 8 is corrected by means of a correcting device 31.

FIG. 7 shows an embodiment of the correcting device 31 for correcting the orientation of the inner rotary body 1 with respect to the outer rotary body 8 as shown in FIG. 1(c). An actuating cylinder 89 is horizontally secured to a base 87 through a bracket 88. A first correcting plate 91 with a horizontal lower surface and having a front edge with a predetermined cam shape is mounted on the end of the rod 90 of the actuating cylinder 89. Moreover, an actuating cylinder 92 is vertically secured to the base 87, directly above the carrying device 13, and a second correcting plate 94 with a horizontal lower surface is mounted to the lower end of the rod 93 of the actuating cylinder 92.

Since the correcting device 31 shown in FIG. 7 is arranged as described above, when the outer rotary body 8 fitted with the inner rotary body 1 reaches the position directly before the correcting device 31, being carried by means of the carrying device 13, first, the rod 90 of the actuating cylinder 89 extends so that the front edge of the first correcting plate 91 horizontally advances while being close to the upper end surface of the outer ring part 10 of the outer rotary body 8 and contacts the inner rotary body 1 projecting upward from the upper end surface of the outer ring part 10. This causes the inner rotary body 1 to tilt in the outer rotary body 8 such that the rotation axis of the inner rotary body 1 is directed substantially vertically. In this case, the outer rotary body 8 is properly rotated about its rotation axis according to the cam shape of the front edge of the first correcting plate 91. Consequently, when the inner rotary body 1 is tilted in the outer rotary body 8 such that the rotation axis of the inner rotary body 1 is directed substantially vertically, the direction of the diameter of the inner rotary body 1 passing through the centers of the pair of the small spheres $7_1$ and $7_4$ respectively becomes parallel to the carrying direction of the carrying device 13.

After the inner rotary body 1 is thus tilted, the rod 90 of the actuating cylinder 89 withdraws and the rod 93 of the actuating cylinder 92 expands, causing the lower surface of the second correcting plate 94 to press the inner rotary body 1, such that the rotation axis of the inner rotary body 1 is accurately directed in the vertical direction to coincide with the rotation axis of the outer rotary body 8. After the second correcting plate 94 presses the inner rotary body 1 until the rotation axis of the inner rotary body 1 coincides with that of the outer rotary body 8, the rod 93 of the actuating cylinder 92 is withdrawn.

In FIG. 2, the inner rotary body 1 and the outer rotary body 8 after being subject to the orientation correction by means of the correcting device 31 are further sent by means of the carrying device 13 to the automatic operation positions IV and V for carrying out the fourth step shown in FIG. 1(d) and FIG. 1(e).

First, at the automatic operation position IV, the inner rotary body 1 is swung in one direction about the swing axis passing through the pair of small spheres $7_1$ and $7_4$ diametrically facing each other as shown in FIG. 1(d), and the small spheres $7_2$ and $7_3$ are forced into the small-sphere receiving holes $6_2$ and $6_3$, on the side which comes out of the outer rotary body 8, by means of small-sphere press fitting parts 33 and 35 formed at the ends of a pair of actuating cylinders 32 and 34, respectively, each having basically the same structure as the actuating cylinder 19 used in the first step.

Moreover, at the automatic operation position V, the inner rotary body 1 is swung in the other direction about the swing axis passing through the pair of small spheres $7_1$ and $7_4$ as shown in FIG. 1(e), and the small spheres $7_5$ and $7_6$ are forced into the small-sphere receiving holes $6_5$ and $6_6$ by means of small-sphere press fitting parts 37 and 39 formed at the end of a pair of actuating cylinders 36 and 38, respectively, each having basically the same structure as the actuating cylinder 19 used in the first step, thereby completing the assembly of a uniform-speed joint.

FIG. 8 and FIG. 9 show an embodiment of a swing device 95 for swinging the inner rotary body 1 for carrying out the fourth step as shown in FIG. 1(d) and FIG. 1(e) at the automatic operation positions IV and V. A piston 97 is slidably received by an actuating cylinder 96 of the swing device 95. A rod 98 formed integrally with the piston 97 is adapted to extend down when working fluid is introduced into the actuating cylinder 96 from a fluid inlet/outlet port 99 and rise when working fluid is introduced into the actuating cylinder 96 from a fluid inlet/outlet port 100. The upper surface of a frame body 101 is secured to the end of the rod 98. A pair of horizontal swing shafts 104 and 105 are secured to the side parts of a swing frame 107 and are swingably supported by the side parts of the frame body 101 through bearings 102 and 103 respectively. An engaging member 106 capable of fitting into the connecting hole 3 of the inner rotary body 1 projects downwardly from the central part of the swing frame 107. The swing device 95 is disposed above the carrying device 13 shown in FIG. 2 in such a way that the swing axes of the pair of swing shafts 104 and 105 are parallel with the carrying direction of the carrying device 13 and also coincide with the swing axis passing through the pair of small spheres $7_1$ and $7_4$ of the inner rotary body 1 on the carrying device 13.

An actuating cylinder 108 is secured to the side part of the frame body 101. A rod 110 of the piston 109, slidably received by the actuating cylinder 108, is adapted to extend downward when working fluid is introduced into the actuating cylinder 108 from a fluid inlet/outlet port 111 and withdraws upward when working fluid is introduced into the actuating cylinder 108 from a fluid inlet/outlet port 112. The lower end of the rod 110 is pivotably supported by one end of a link 113 through a pivoting pin 114, while the other end of the link 113 is pivotably supported through a pivoting pin 118 at the end of an arm 117 having a proximal end secured to a gear 116 rotatably supported through a supporting shaft 115 on the side of the frame body 101. The gear 116 is engaged with a gear 119 secured to the swing shaft 105.

Since the swing device 95 shown in FIG. 8 and FIG. 9 is arranged described above, when the inner rotary body 1 and the outer rotary body 8 reach the position directly below the engaging member 106, being carried by the carrying device 13, with the axis of rotation of the inner rotary body 1 directed in the vertical direction, the fluid inlet/outlet port 100 is coupled to the fluid tank and working fluid is introduced into the actuating cylinder 96 from the fluid inlet/outlet port 99, so that the rod 98 extends downward with the frame body 101, causing the engaging member 106 to be fitted into the connecting hole 3 of the inner rotary body 1. In this condition, when the fluid inlet/outlet port 112 is coupled to the fluid tank and working fluid is introduced into the actuating cylinder 108, the rod 110 extends downward, so that the descending motion of the rod 110 is converted into a rotational motion of the gear 116 through the link 113 and the arm 117. Moreover, the rotational motion of the gear 116 is transmitted to the gear 119, so that the engaging member 106 swings in one direction about the swing axes of the swing shafts 104 and 105. As a result, since the inner rotary body 1 is swung in one direction about the swing axis passing through the pair of small spheres $7_1$ and $7_4$, it is possible to force the small spheres $7_2$ and $7_3$ into the small-sphere receiving holes $6_2$ and $6_3$ on the side which is out of the outer rotary body 8 by means of the small-sphere press fitting parts 33 and 35 formed at the end of the rods of the actuating cylinders 32 and 34 respectively.

On completion of the press fitting of the small spheres $7_2$ and $7_3$ into the corresponding small-sphere receiving holes $6_2$ and $6_3$, the fluid inlet/outlet port 111 is coupled to the fluid tank and working fluid is introduced into the actuating cylinder 108 from the fluid inlet/outlet port 112, so that the rod 110 withdraws upward. Consequently, the ascending motion of the rod 110 causes the gear 116 to reverse rotation. Moreover, the reverse rotation of the gear 119 causes the engaging member 106 to swing in the reverse direction about the axes of the swing shafts 104 and 105, together with the swing frame 107, and return to their original position. As a result, the rotation axis of the inner rotary body 1 is directed in the vertical direction and coincides with the rotation axis of the outer rotary body 8. In this condition, the fluid inlet/outlet port 99 is coupled to the fluid tank and working fluid is introduced into the actuating cylinder 96 from the fluid inlet/outlet port 100, so that the rod 98 is withdrawn upward. Consequently, the frame body 101 rises together with the engaging member 106. When the engaging member 106 is released from the connecting hole 3 of the inner rotary body 1, the operation at the automatic operation position IV shown in FIG. 2 is completed.

After the completion of the operation at the automatic operation position IV, the inner rotary body 1 and the outer rotary body 8 are successively carried to the automatic operation position V by means of the carrying device 13. At the automatic operation position V, the inner rotary body 1 is swung in the direction opposite to that in the operation at the automatic operation position IV about the swing axis passing through the pair of spheres $7_1$ and $7_4$ by means of another swing device having basically the same structure as the swing device 95 and positioned in a direction opposite to the swing device 95 with respect to the carrying device 13. As a result, the small spheres $7_5$ and $7_6$ are forced into the small-sphere receiving holes $6_5$ and $6_6$ on the side of the outer rotary body 8 by means of the small-sphere press fitting parts 37 and 39 formed at the ends of the rods of the actuating cylinders 36 and 38 and respectively, as shown in FIG. 1(e).

As will be fully understood from the foregoing description, the invention provides the following advantages.

First, the first step is simpler and consequently can be easily automated and moveover, the subsequent steps can be readily carried out, since the small spheres are fitted into a pair of small-sphere receiving holes, located facing each other in the diametrical direction of the inner rotary body.

In the second step, the inner rotary body can be smoothly fitted into the outer rotary body, since the inner rotary body is fitted into the outer rotary body while maintaining a relative orientation to the outer rotary body wherein the rotation axis of the inner rotary body is perpendicular to that of the outer rotary body and moreover, there is no interference between the pair of small spheres and the edge of the outer rotary body.

In addition, since the rotation axes of the inner rotary body and the outer rotary body are allowed to coincide with each other in the third step, the inner rotary body can be smoothly received by the outer rotary body at the stage where the small spheres have not been fitted into all the small-sphere receiving holes of the inner rotary body and moreover, the subsequent steps can be readily carried out.

Furthermore, in the fourth step, since the inner rotary body is swung relative to the outer rotary body about the diametrical swing axis passing through a pair of small spheres and then the small spheres are fitted into the corresponding small-sphere receiving holes in the portion of the inner rotary body which is out of the outer rotary body, all the small spheres other than the pair of small spheres fitted in the first step can be efficiently fitted into the corresponding small-sphere receiving holes and moreover, the operation can be easily carried out and it is possible to ensure the attainment of automation.

Thus, according to the present invention, it is possible to assemble uniform-speed joints completely automatically and efficiently without need for any manual operations through all the steps.

The present invention may be embodied in other specific forms without departing from the spirit or essential characteristics thereof. The presently disclosed embodiments are, therefore, to be considered in all respects as illustrative and not restrictive, the scope of the invention being indicated by the appended claims, rather than the foregoing description, and all changes which come within the meaning and range of equivalency of the claims are, therefore, to be embraced therein.

What is claimed is:

1. A method for assembling a uniform-speed joint having an inner rotary body and an outer rotary body which transmits a rotational force from one to the other through a plurality of small spheres in receiving holes on the disposed outer peripheral surface of said inner rotary body and including a first pair of small spheres diametrically facing each other where the intersecting angle between the rotation axes of said inner rotary body and said outer rotary body is variable and the rotational speed is not changed, said method comprising the steps of:

(a) fitting said first small spheres into a diametrically opposed pair of said small-sphere receiving holes in said inner rotary body;

(b) fitting said inner rotary body into said outer rotary body while maintaining the rotation axis of said inner rotary body perpendicular to the rotational axis of said outer rotary body with no interference between said first pair of small spheres and the edge of said outer rotary body;

(c) bringing the rotation axes of said inner rotary body and said outer rotary body into coincidence with each other; and (d) swinging said inner rotary body relative to said outer rotary body about the diametrical swing axis passing through said first pair of small spheres; and (e) then fitting additional small spheres into the corresponding small-sphere receiving holes of said inner rotary body in the portion of said inner rotary body which is out of said outer rotary body as a result of the swinging step.

* * * * *